much of it as is necessary to raise the sulfur content of the gasoline to permissible levels. In practice, it is sometimes desirable to sweeten a small portion of the hydrocarbons so as to remove substantially all of the mercaptans therefrom and then to blend this portion with the unsweetened portion so as to reduce the over-all sulfur content of the hydrocarbons to within commercial specifications. Accordingly, the terms "sweeten" or "sweetening," as employed herein, are to be used in the sense that the amount of mercaptan in at least a portion of the hydrocarbons is reduced.

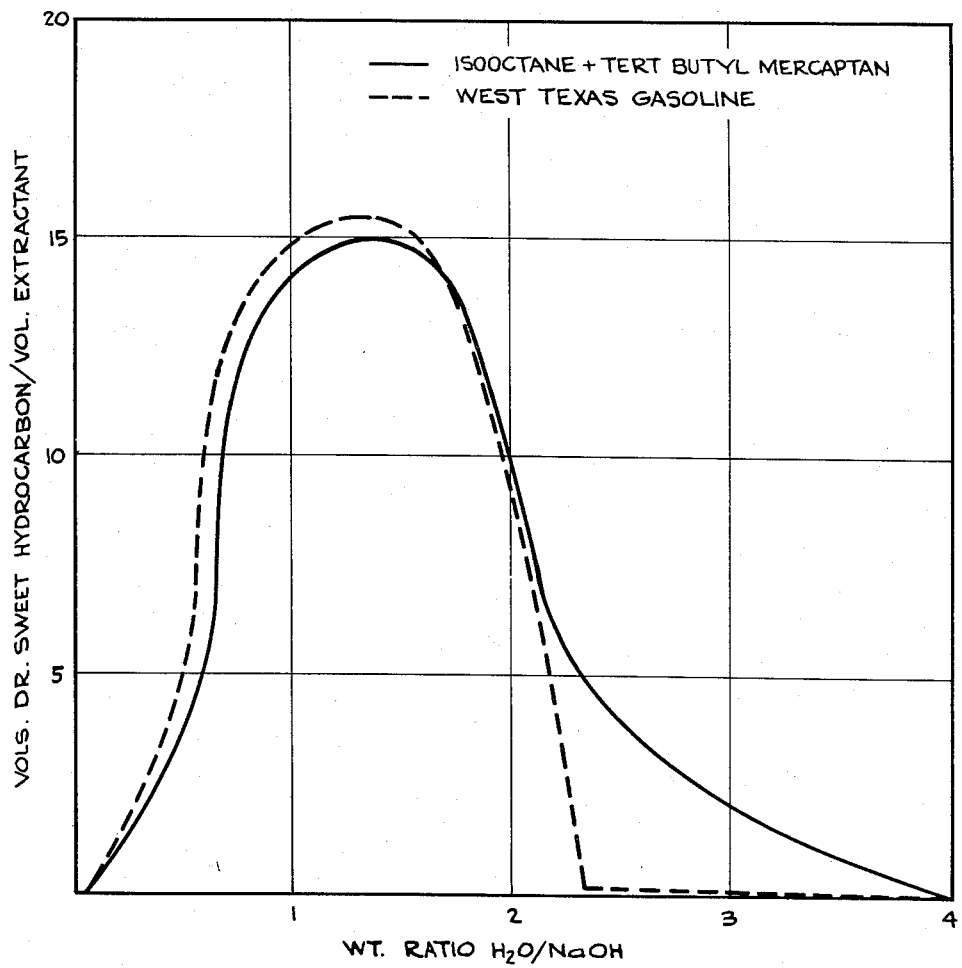

United States Patent Office 2,748,059
Patented May 29, 1956

2,748,059

REMOVING MERCAPTANS FROM HYDROCARBONS WITH ACTIVE CARBON IMPREGNATED WITH ALKALI

Alan C. Nixon, Berkeley, and Harry B. Minor, Orinda, Calif., assignors to Shell Development Company, Emeryville, Calif., a corporation of Delaware Application May 18, 1953, Serial No. 355,634

4 Claims. (Cl. 196—32)

This invention relates to the treatment of hydrocarbons to remove mercaptans normally present or formed therein. More particularly, it relates to the treatment of petroleum fractions, specifically, gasoline, kerosene and like distillates, in order to remove mercaptans therefrom. This invention also relates to a composition suitable for selectively removing mercaptans from mercaptan-containing hydrocarbons.

It is well known that mercaptans, which are objectionable, especially from the standpoint of odor, can be removed from hydrocarbons, particularly gasoline hydrocarbons, by treatment with an aqueous solution of an alkaline material, such as caustic soda. The aqueous alkaline solution preferentially dissolves the mercaptans which are then converted, in the aqueous alkaline solution, to the corresponding mercaptides by reaction with the alkaline compound. The extent to which the mercaptans can be removed depends, principally, upon the solubility of the mercaptans in the aqueous alkaline solution which in turn depends upon the molecular weight and structure of the mercaptans. The higher molecular weight mercaptans, such as the butyl mercaptans, are less soluble and, therefore, more difficult to remove. It is known that the solubility of the mercaptans in the alkaline solution can be improved, to some extent, by the addition of certain compounds generally known as solutizers. However, even in the presence of solutizers, an equilibrium is soon reached, and further portions of mercaptans will not be dissolved by the alkaline solution. Thus, the alkaline solution becomes quickly spent, and must be regenerated before further use.

In order to overcome the foregoing disadvantages, it has been proposed to treat mercaptan-containing hydrocarbons for the removal of mercaptans therefrom, with an alkali-impregnated solid adsorbent in accordance with the process disclosed in United States Patent No. 2,577,824. According to the process disclosed therein, mercaptan-containing hydrocarbons are contacted with an alkali-impregnated charcoal which is prepared by contacting the charcoal with an aqueous solution of an alkaline base, such as caustic soda, for a time sufficient for the charcoal to become saturated, and then draining excess alkali from the charcoal. The thus saturated charcoal is then ready for use. Although the extractant prepared in accordance with the disclosure of the cited patent is effective for removing the relatively low molecular weight mercaptans, such as the propyl mercaptans, it still does not readily remove the relatively high molecular weight mercaptans, such as the butyl mercaptans.

It is, therefore, a principal object of the present invention to provide an improved process for removing mercaptans from mercaptan-containing hydrocarbons. A more specific object is to provide an improved process for removing mercaptans from gasoline hydrocarbons. Still another object is to provide a solid extractant suitable for removing mercaptans from mercaptan-containing hydrocarbons. Other objects and advantages will become apparent from the following detailed description made with reference to the accompanying figure which represents graphically the number of volumes of doctor sweet hydrocarbons obtained per volume of extractant at various weight ratios of water to alkaline material in the extractant.

According to the present invention, it has now been found that a composition comprising a solid support, such as active carbon, impregnated with an aqueous alkaline solution in an amount insufficient to saturate the solid support, the weight ratio of water to alkaline material in the composition being from about 0.5 to about 2.0, is particularly effective for extracting mercaptans from mercaptan-containing hydrocarbons.

More particularly, it has been found that a composition comprising a solid support, such as active carbon, impregnated with an aqueous alkaline solution in an amount insufficient to saturate the solid support, the weight ratio of water to alkaline material in the composition being from about 0.75 to about 1.75, is an effective extractant for the removal of mercaptans from mercaptan-containing hydrocarbons, particularly mercaptan-containing petroleum fractions.

According to a preferred embodiment of the invention, a mercaptan-containing gasoline is sweetened by a process comprising contacting the mercaptan-containing gasoline with a solid extractant comprising a solid support, such as active carbon, impregnated with an aqueous alkaline solution, such as an aqueous solution of caustic soda, which extractant has been subjected to an elevated temperature, the weight ratio of water to alkaline material in the extractant being from about 0.75 to about 1.75, and the amount of aqueous alkaline solution in the extractant being insufficient to saturate the solid support, whereby the mercaptans are converted to mercaptides which are preferentially adsorbed by the solid extractant, and separating the gasoline of reduced sulfur content from the mercaptide-containing extractant.

The solid support employed in accordance with the present invention is preferably an inert solid material, that is, a material which is not reactive with a strongly alkaline solution. Because of its high adsorptivity and because it is completely inert towards strong alkali, activated carbon or charcoal is preferred. The active carbon employed is not limited to that of any particular source and can comprise, for example, activated vegetable or animal charcoals such as the cocoanut charcoals, wood charcoals, peach pit charcoals, bone charcoals, etc., as prepared and activated by various commercial suppliers. It is preferred that the solid support used be divided into relatively small particles having, for example, a range of 1 to 80 mesh, and preferably a range of 4 to 20 mesh.

The alkaline material used for impregnating the solid support can be any material known to be suitable for the extraction of mercaptans from hydrocarbons. The most commonly used alkaline materials are the strong inorganic bases, such as sodium and potassium hydroxide, and the strong organic bases, such as tetramethylammonium hydroxide. The concentration of the aqueous alkaline solution used can vary within fairly wide limits since the extractant of the present invention is usually prepared by first saturatin gthe solid support with the aqueous alkaline solution and then adjusting the water-to-alkali ratio of the product to within the above-specified critical limits by partially drying the saturated material at a suitable temperature as hereinafter described. However, concentrations of less than about 5% are so weak that sufficient alkali is not adsorbed by the solid support to be effective for treating hydrocarbons, and concentrations of over about 50% by weight present viscosity and other similar problems. The preferred concentration is from about 10% to about 30% by weight.

The extractant of the present invention is preferably prepared by contacting the solid support, preferably active carbon, with an aqueous solution of an alkaline material, such as caustic soda, for a time sufficient to saturate the solid support with the alkaline solution. The temperature at which the solid support is thus treated is not critical; ambient room temperature can be employed. If desired, the temperature of contact can be raised slightly above room temperature in order to saturate the solid adsorbent more quickly. After the solid adsorbent has become saturated with the alkaline material, the excess alkaline material is removed therefrom. This can be accomplished by any suitable conventional method, as by filtration. The saturated solid support is then suitably dried to reduce the water content of the composition and to adjust the weight ratio of water to alkaline material to within the above-specified critical range of from about 0.5 to about 2.0, and preferably from about 0.75 to about 1.75. Drying of the saturated solid support can be accomplished by any conventional method. For example, the saturated solid adsorbent can be heated, preferably under vacuum, e. g., at a pressure of 5 to 10 mm. Hg, to moderate temperatures of the order of from about 80° C. to about 200° C. for a period of about 2–12 hours depending upon the concentration of the aqueous alkaline solution employed, or a heated inert gas, such as fuel gas, nitrogen or the like, can be passed through the saturated solid support for a time sufficient to adjust the water-to-alkali weight ratio to within the specified critical limits. This heat treatment, of itself, contributes to the activity of the solid extractant apart from adjusting the water-to-alkali weight ratio in the extractant. In addition to the requirement that the weight ratio of water to alkaline material in the extractant be within the specified critical limits, it is necessary that the solid extractant be unsaturated with respect to the aqueous alkaline solution employed. By partially drying a saturated solid support by the procedure hereinbefore described, an unsaturated product will be obtained. Preferably, the amount of aqueous alkaline solution in the partially dried extractant should not exceed about 85% of saturation.

The hydrocarbon treating operation can be carried out by any of the well known solid-liquid contacting procedures. A continuous method is generally preferred. The most suitable contacting procedure is to pass the liquid mercaptan-containing hydrocarbons, at an appropriate rate, through a column packed with the extractant prepared as described above, until the extractant becomes spent. The rate at which the hydrocarbons are passed through the column depends primarily upon the extent of mercaptan removal desired, which in turn is dependent upon the amount and nature of the mercaptans in the feed stock, and the amount of mercaptans which can be present in the final product while still meeting required specifications. The preferred rate is from about 1 to about 10 volumes of hydrocarbon per volume of extractant per hour. The upper rate is usually limited by operating requirements, particularly the pressure drop through the bed. Contact between the solid extractant and the hydrocarbons to be treated can be improved by the use of a vibrator in the extraction column. After the extractant becomes spent with respect to its mercaptan removing capacity, it can be regenerated by any of the conventional means for caustic regeneration, such as blowing with steam to strip out the mercaptans, or by treatment with oxygen in the presence of a catalyst, if desired, in order to oxidize the mercaptans to the corresponding disulfides. The disulfides can be removed from the regenerated extractant by washing with a solvent or by steam stripping.

A particularly suitable contacting procedure comprises employing two columns, each packed with extractant, and each column being utilized, alternately, for mercaptan extraction and for regeneration of spent extractant. The mercaptan-containing hydrocarbons are passed through the first column until the extractant therein becomes spent. Passage of the hydrocarbons through the first column is then discontinued, and the hydrocarbons are passed through the second column. During the treatment of the hydrocarbons in the second column, the spent extractant in the first column is regenerated by any of the methods described above. In this manner, the hydrocarbon treatment can be accomplished continuously and without interruption.

Another suitable procedure involves the use of a moving bed. According to this procedure, alkali-impregnated beads or powder, prepared in the same manner as described above, is passed downwardly, as a moving bed, through an extraction column in countercurrent contact with mercaptan-containing hydrocarbons. Spent extractant is removed from the extraction column and then passed as a moving bed, through a regeneration column in countercurrent contact with a regenerating agent.

The temperature at which the hydrocarbon fraction is treated for removal of mercaptans, should be such that all materials are in the liquid phase. A temperature between about 50° and about 225° F. is generally employed. The process is advantageously carried out at temperatures of gasoline normally encountered in the refinery at the time of mercaptan removal, such as 70° to 120° F.

It is generally desirable to remove any alkyl phenols present in the mercaptan-containing hydrocarbons prior to the treatment thereof for mercaptan removal. Alkyl phenol removal can be accomplished in the lower portion of the mercaptan extraction column, near the point of introduction of the mercaptan-containing hydrocarbons, by introducing an aqueous alkaline solution, such as a caustic soda solution, into the lower portion of the extraction column whereby an aqueous solution of sodium alkyl phenolates is obtained, which solution is removed from the bottom of the column.

After the treatment of the hydrocarbons with the solid extractant according to the present invention, the treated product can be blown with air to oxidize any residual mercaptans to disulfides, and thereby insure a substantially mercaptan-free product. If desired, oxidation of residual mercaptans can be effected in the upper portion of the extraction column near the point of removal of the treated hydrocarbons. However, during the mercaptan extraction operation, it is advisable to exclude air as completely as possible in order to avoid oxidation of substantial portions of mercaptans to disulfides since the disulfides will remain dissolved in the hydrocarbon phase, thereby adding to the sulfur content of the finished product and reducing the susceptibility of the product to octane rating improvement by means of tetraethyl lead. The small amounts of disulfides remaining in the product after oxidation of residual mercaptans are not sufficient to materially affect the quality of the product.

To increase the solubility of the mercaptans in the aqueous phase, solutizers, generally phenolic compounds, can be used in connection with the solid extractant of the present invention.

The following examples are illustrative of the present invention, but are not to be considered as limiting the specification or the claims thereto in any manner.

EXAMPLE I

Isooctane, containing about 0.077% sulfur as tertiary butyl mercaptan, was passed upwardly through a column containing 8–14 mesh activated carbon impregnated with a solution of sodium hydroxide, at a rate of about 2 volumes of hydrocarbon per volume of extractant per hour. This process was carried out using extractants of varying water-to-caustic weight ratios as shown in Table I. The results obtained for the various runs are given in Table I.

Table I

| Run | Volumes of Doctor Sweet Hydrocarbon per Volume of Extractant | H₂O/NaOH |
|---|---|---|
| 1 | 0 | [1] 0.0366 |
| 2 | 8½ | [1] 0.67 |
| 3 | 13½ | [1] 0.71 |
| 4 | 15 | [1] 1.33 |
| 5 | 5 | [1] 2.31 |
| 6 | 1 | [2] 4.0 |

[1] Prepared by drying active carbon which has been saturated with a 20 percent solution of sodium hydroxide.
[2] Active carbon saturated with a 20 percent w. solution of sodium hydroxide.

EXAMPLE II

A west Texas straight-run gasoline containing about 0.07% of mercaptan sulfur, was passed upwardly through a column containing 8–14 mesh activated carbon impregnated with a solution of sodium hydroxide, at a rate of about 1.5 volumes of gasoline per volume of extractant per hour. This process was carried out using extractants of varying water-to-caustic weight ratios as shown in Table II. The results obtained for the various runs are given in Table II.

Table II

| Run | Volumes of Doctor Sweet Gasoline per Volume of Extractant | H₂O/NaOH |
|---|---|---|
| 1 | 0½ | [1] 0.04 |
| 2 | 13½ | [1] 0.67 |
| 3 | 16 | [1] 1.33 |
| 4 | 0 | [1] 2.31 |
| 5 | 0 | [2] 4.0 |

[1] Prepared by drying active carbon which has been saturated with a 20 percent w. solution of sodium hydroxide.
[2] Active carbon saturated with a 20 percent w. solution of sodium hydroxide.

The results shown in Tables I and II are represented graphically in the accompanying figure. From a consideration of the graph, it can be seen that, by using a partially dried, alkali-impregnated solid support in which a weight ratio of water to alkaline material is within the range of from about 0.5 to about 2.0, outstanding results are obtained.

EXAMPLE III

Isooctane, containing about 0.07% sulfur as tertiary butyl mercaptan, was passed upwardly through a column containing finely divided asbestos impregnated with an aqueous sodium hydroxide solution, the weight ratio of water to sodium hydroxide in the extractant being 1.5, at a rate of about 2 volumes of hydrocarbon per volume of extractant per hour. Fourteen volumes of doctor sweet product were obtained per volume of extractant.

EXAMPLE IV

Active carbon, having a particle size of about 8–14 mesh, was saturated with 40° Be. sodium hydroxide solution, which has a water-to-caustic weight ratio of 1.85. This extractant, when used to treat a West Texas straight-run gasoline containing about 0.07% mercaptan sulfur, was found to be initially ineffective, while after moderate drying it was quite active. From the foregoing results, it can be seen that the extractant must be unsaturated with respect to the aqueous alkaline solution in addition to having a water-to-alkaline material weight ratio of between about 0.5 and about 2.0.

We claim as our invention:

1. In a method of treating a mercaptan-containing hydrocarbon for the removal of mercaptans therefrom, the step comprising contacting said hydrocarbon with a solid extractant consisting essentially of an activated carbon which has been impregnated to saturation with an aqueous solution of from about 5 to 50% by weight of an alkali metal hydroxide, drained of free liquid excess of such solution, and dried at an elevated temperature from about 80 to about 200° C. to reduce the water content thereof to no greater than 85% of the water content at saturation while maintaining the same alkali metal hydroxide content and also to an extent such that the weight ratio of water to alkali metal hydroxide in the resulting solid extractant is from about 0.5 to about 2.0.

2. In a method of treating a mercaptan-containing gasoline for the removal of mercaptans therefrom, the step comprising contacting said gasoline with a solid extractant consisting essentially of activated carbon which has been impregnated to saturation with an aqueous solution of from about 5 to about 50% by weight sodium hydroxide, drained of free liquid excess of such solution and dried at an elevated temperature from about 80 to about 200° C. to reduce the water content thereof to no greater than 85% of the water content at saturation while maintaining the same sodium hydroxide content and also to an extent such that the weight ratio of water to sodium hydroxide in the resulting solid extractant is from about 0.75 to about 1.75.

3. A method of removing mercaptans from a mercaptan-containing gasoline which comprises: (1) contacting said gasoline with a solid extractant consisting essentially of a particulate active carbon which has been impregnated to saturation with an aqueous solution of from about 10 to about 30% by weight sodium hydroxide, drained of free liquid excess of such solution and dried to an elevated temperature from about 80 to about 200° C. to reduce the water content thereof to no greater than 85% of the water content at saturation while maintaining the same sodium hydroxide content and also to an extent such that the weight ratio of water to sodium hydroxide in the resulting solid extractant is from about 0.75 to about 1.75, said contacting being effected at a rate of from about 1 to about 10 volumes of gasoline per volume of said solid extractant per hour, and (2) separating gasoline of reduced mercaptan content from the solid extractant.

4. A solid extractant composition suitable for the selective removal of mercaptans from mercaptan-containing hydrocarbons consisting essentially of a particulate activated carbon which has been impregnated to saturation with an aqueous solution of from about 5 to about 50% by weight sodium hydroxide, drained of free liquid excess of such solution and dried at an elevated temperature from about 80 to about 200° C. to reduce the water content thereof to no greater than 85% of the water content at saturation while maintaining the same sodium hydroxide content and also to an extent such that the weight ratio of water to sodium hydroxide in the resulting solid extractant composition is from about 0.5 to about 2.0.

References Cited in the file of this patent
UNITED STATES PATENTS

| | | |
|---|---|---|
| 1,890,516 | Lackman | Dec. 13, 1932 |
| 1,936,210 | Retailliau | Nov. 21, 1933 |
| 2,471,108 | Hill | May 24, 1949 |
| 2,557,824 | Stine | Dec. 11, 1951 |

OTHER REFERENCES

Karrer: Organic Chemistry, third edition, page 116 (1947), published by Elseiver Publishing Co., New York.